United States Patent
Kim

(10) Patent No.: US 9,133,603 B2
(45) Date of Patent: Sep. 15, 2015

(54) CONSTRUCTION MACHINE CAB HAVING A ROLLOVER PROTECTION STRUCTURE

(75) Inventor: Kang-Tae Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 13/879,742

(22) PCT Filed: Oct. 20, 2010

(86) PCT No.: PCT/KR2010/007174
§ 371 (c)(1),
(2), (4) Date: Apr. 16, 2013

(87) PCT Pub. No.: WO2012/053671
PCT Pub. Date: Apr. 26, 2012

(65) Prior Publication Data
US 2013/0221703 A1   Aug. 29, 2013

(51) Int. Cl.
*B60J 7/00*  (2006.01)
*E02F 9/16*  (2006.01)
*B62D 33/06* (2006.01)

(52) U.S. Cl.
CPC ............ *E02F 9/163* (2013.01); *B62D 33/0617* (2013.01)

(58) Field of Classification Search
CPC ...... E02F 9/163; E02F 3/325; B62D 33/0617; B62D 33/0633; B62D 21/152; B60J 5/0487
USPC ............. 296/193.03, 187.09, 190.01, 190.08, 296/190.11, 205; 180/89.12; 280/432, 756
See application file for complete search history.

(56) References Cited

U.S. PATENT DOCUMENTS

| | | | |
|---|---|---|---|
| 4,135,756 A | | 1/1979 | Hausmann |
| 6,012,765 A | * | 1/2000 | Novoa et al. ............. 296/190.08 |
| 6,032,980 A | | 3/2000 | Rapp et al. |
| 6,120,089 A | * | 9/2000 | Kalstiantz et al. ......... 296/186.1 |
| 6,206,457 B1 | * | 3/2001 | Sakyo et al. ............. 296/190.08 |
| 6,209,949 B1 | * | 4/2001 | Sakyo et al. ............. 296/190.08 |

(Continued)

FOREIGN PATENT DOCUMENTS

| | | |
|---|---|---|
| CN | 1218863 A | 6/1999 |
| CN | 1724819 A | 1/2006 |

(Continued)

OTHER PUBLICATIONS

International Search Report (in Korean and English) and Written Opinion (in Korean) for PCT/KR2010/007174, mailed Jul. 26, 2011; ISA/KR.

(Continued)

*Primary Examiner* — Kiran B Patel
(74) *Attorney, Agent, or Firm* — Harness, Dickey & Pierce, P.L.C.

(57) ABSTRACT

A cab having a rollover protection structure for a construction machine is provided, which includes a front right pole positioned on the front right side of the cab and formed to extend upwardly from a bottom frame, a front left pole positioned on the front left side of the cab and formed to be spaced apart from the front right pole, a front upper end lateral pole connecting upper ends of the front right pole and the front left pole to each other, a first reinforcement member installed on an upper portion of the front right pole, and a second reinforcement member installed on a lower portion of the front left pole.

2 Claims, 1 Drawing Sheet

(56) References Cited

U.S. PATENT DOCUMENTS

| | | | |
|---|---|---|---|
| 6,308,411 B1* | 10/2001 | Wright et al. | 29/897.2 |
| 6,325,450 B2* | 12/2001 | Sakyo et al. | 296/190.08 |
| 6,543,840 B2* | 4/2003 | Colliar et al. | 296/190.08 |
| 6,568,746 B2* | 5/2003 | Sakyo et al. | 296/190.08 |
| 6,582,010 B2* | 6/2003 | Sakyo et al. | 296/190.08 |
| 6,729,031 B2* | 5/2004 | McKee | 52/204.1 |
| 6,948,768 B2* | 9/2005 | Corcoran et al. | 296/190.08 |
| 7,048,082 B2* | 5/2006 | Mori et al. | 180/89.12 |
| 7,246,846 B2* | 7/2007 | Shioji et al. | 296/190.11 |
| 7,413,241 B2* | 8/2008 | Murakami et al. | 296/190.08 |
| 7,575,266 B2* | 8/2009 | Sato | 296/39.3 |
| 7,575,272 B2* | 8/2009 | Ishii et al. | 296/190.04 |
| 7,581,783 B2* | 9/2009 | Mori et al. | 296/190.08 |
| 7,695,055 B2 | 4/2010 | Tsukamoto | |
| 7,712,824 B2* | 5/2010 | Mori | 296/190.03 |
| 7,753,426 B2* | 7/2010 | Sato | 296/39.3 |
| 7,959,219 B2* | 6/2011 | Namura et al. | 296/190.08 |
| 8,029,044 B2* | 10/2011 | Akahane et al. | 296/190.11 |
| 8,079,636 B2* | 12/2011 | Namura et al. | 296/190.08 |
| 8,128,155 B2* | 3/2012 | Ansorge | 296/190.03 |
| 8,162,388 B2* | 4/2012 | Balzer et al. | 296/203.03 |
| 8,177,290 B2* | 5/2012 | Kamimae | 296/190.08 |
| 8,240,745 B2* | 8/2012 | Yamamoto et al. | 296/190.03 |
| 2001/0005092 A1* | 6/2001 | Sakyo et al. | 296/190.08 |
| 2002/0079721 A1* | 6/2002 | Colliar et al. | 296/190.08 |
| 2002/0149232 A1* | 10/2002 | Sakyo et al. | 296/190.08 |
| 2002/0153748 A1* | 10/2002 | Sakyo et al. | 296/190.08 |
| 2005/0006157 A1* | 1/2005 | Shioji et al. | 180/89.13 |
| 2007/0024088 A1* | 2/2007 | Mori et al. | 296/190.08 |
| 2007/0085380 A1* | 4/2007 | Murakami et al. | 296/190.08 |
| 2007/0257517 A1* | 11/2007 | Day et al. | 296/193.06 |
| 2007/0278826 A1* | 12/2007 | Sato | 296/190.08 |
| 2008/0238144 A1* | 10/2008 | Kamimae | 296/190.08 |
| 2009/0134665 A1 | 5/2009 | Tsukamoto | |
| 2009/0273206 A1* | 11/2009 | Namura et al. | 296/190.03 |
| 2010/0117399 A1* | 5/2010 | Akahane et al. | 296/190.08 |
| 2011/0025097 A1* | 2/2011 | Yamamoto et al. | 296/190.03 |
| 2011/0057479 A1* | 3/2011 | Namura et al. | 296/190.08 |
| 2011/0121609 A1* | 5/2011 | Hoefle et al. | 296/190.08 |
| 2013/0127205 A1* | 5/2013 | Jaynes | 296/190.1 |
| 2014/0017053 A1* | 1/2014 | Tanaka et al. | 414/687 |

FOREIGN PATENT DOCUMENTS

| | | |
|---|---|---|
| CN | 1775607 A | 5/2006 |
| DE | 2125595 A1 | 2/1973 |
| JP | 11049038 | 2/1999 |
| JP | 11166247 | 6/1999 |
| JP | 2005-035316 A | 2/2005 |
| JP | 2006298237 A | 11/2006 |
| JP | 2009-234439 A | 10/2009 |
| JP | 2010043412 A | 2/2010 |
| KR | 10-2008-0041301 A | 5/2008 |
| WO | WO-2008-47505 A1 | 4/2008 |

OTHER PUBLICATIONS

International Preliminary Report on Patentability (Chapter II) (in Korean) for PCT/KR2010/007174, dated Feb. 15, 2013; IPEA/KR.

Notification of the First Office Action from the State Intellectual Property Office of People's Republic of China regarding Chinese Patent Application No. 20108006968.2, dated Sep. 3, 2014.

Supplementary European Search Report regarding European Application No. EP10858680, dated Jul. 25, 2014.

Notice of Reasons for Rejection regarding Japanese Application No. JP2013534785, dated Sep. 16, 2014.

* cited by examiner

CONSTRUCTION MACHINE CAB HAVING A ROLLOVER PROTECTION STRUCTURE

CROSS-REFERENCE TO RELATED APPLICATIONS

This is a U.S. National Stage Application of International Application No. PCT/KR2010/007174, filed on Oct. 20, 2010 and published in Korean as WO 2012/053671 A1 on Apr. 26, 2012. The disclosure of the above application is incorporated herein by reference.

TECHNICAL FIELD

The present invention relates to a cab having a rollover protection structure for a construction machine. More particularly, the present invention relates to a cab having a rollover protection structure for a construction machine, which enables an operator to secure a sufficient field of front vision through an effective arrangement of reinforcement members at low manufacturing cost.

BACKGROUND ART

A construction machine such as an excavator has been used to perform work at civil engineering work site for performing excavation of earth and sand or gravel.

In general, as important components, such an excavator includes a lower driving structure, an upper swing structure mounted to swing on the lower driving structure, and a cab for an operator fixedly arranged on the upper swing structure.

As illustrated in FIG. 1, a cab in the related art is constructed to include a bottom frame, front poles positioned in front to extend upward from the bottom frame, and rear poles positioned in the rear.

In general, various kinds of construction equipment having different sizes have been produced even if such equipment may be of the same type, but one kind of cab structure is typically applied to such various kinds of construction equipment.

Since the cab structure must endure the heavy load of the equipment, cross sections of cab strength members are increased to cause the field of front vision to be narrowed and cab manufacturing cost to be increased.

DISCLOSURE

Technical Problem

Therefore, the present invention has been made to solve the above-mentioned problems occurring in the related art, and one embodiment of the present invention is related to lowering of the production cost through application of first and second reinforcement member only to portions to which the load is concentrated and to securing of a sufficient field of front vision through installation of a third reinforcement member in the center of a cab ceiling portion.

Technical Solution

In accordance with an aspect of the present invention, there is provided a cab having a rollover protection structure for a construction machine, which includes a front right pole positioned on the front right side of the cab and formed to extend upwardly from a bottom frame; a front left pole positioned on the front left side of the cab and formed to be spaced apart from the front right pole; a front upper end lateral pole connecting upper ends of the front right pole and the front left pole to each other; a first reinforcement member installed on an upper portion of the front right pole; and a second reinforcement member installed on a lower portion of the front left pole.

Advantageous Effect

According to an embodiment of the present invention as described above, the following effects can be achieved.

When the rollover occurs, the load generated due to the self-weight of the equipment is concentrated to left upper end horizontal members of the cab to cause the cab to be deformed, and the upper end portion of the front right pole of the cab reaches a boom to cause the load to be concentrated to the front right pole. First, in order to prevent severe deformation of the front right pole, the first reinforcement member is inserted into the upper end of the front right pole, and the second reinforcement member is inserted into the lower end of the front left pole. Accordingly, when the rollover occurs, it is possible to effectively protect the operator while reducing the manufacturing cost of the cab.

Second, since the reinforcement members of the cab are inserted into the front left/right poles to reinforce the poles, the cab has the same external appearance, and thus can be applied to various kinds of construction equipment having various sizes. Accordingly, the components can be commonized and modularized to reduce the cost.

Third, since the cab having the same structure can be applied to various kinds of equipment, advertisement effects can be achieved through implementation of the same image of the external appearance of the equipment.

Fourth, by reinforcing the center lateral pole with the third reinforcement member rather than the front lateral pole, the operator's field of front vision can be sufficiently secured.

BRIEF DESCRIPTION OF THE DRAWINGS

The above objects, other features and advantages of the present invention will become more apparent by describing the preferred embodiments thereof with reference to the accompanying drawings, in which.

BEST MODE

Figure 1:
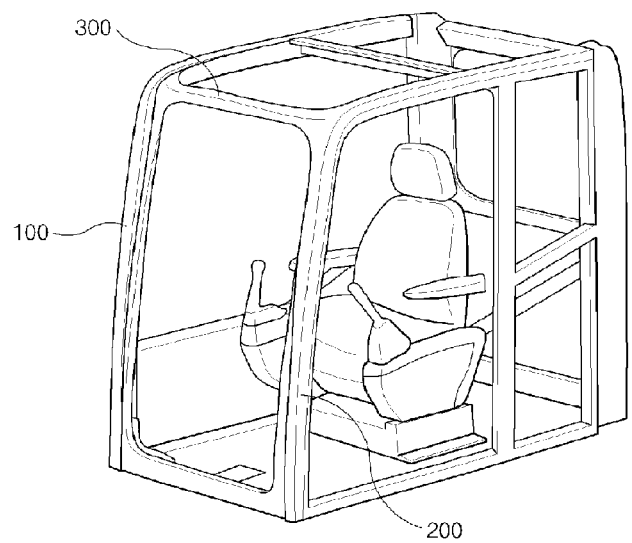
FIG. 1 is a perspective view illustrating a cab having a rollover protection structure for a construction machine in the related art.

Now, a cab having a rollover protection structure for a construction machine according to a preferred embodiment of the present invention will be described in detail with reference to the accompanying drawings. In the drawings, thicknesses of lines and sizes of constituent elements may be exaggerated for clarity and convenience in explanation.

Further, wordings to be described later are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Figure 2:
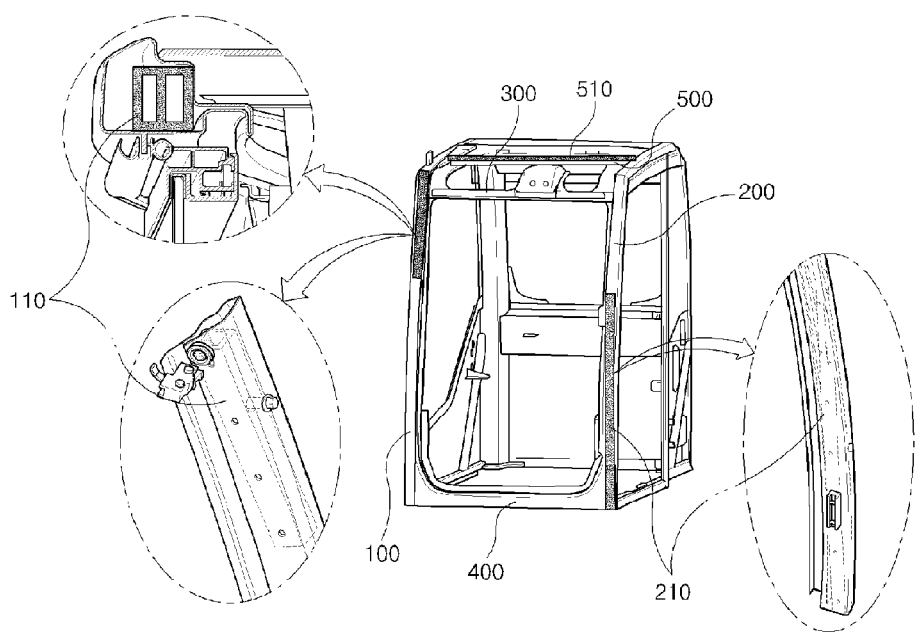
FIG. 2 is an exploded perspective view illustrating a cab having a rollover protection structure for a construction machine according an embodiment of the present invention.

FIG. 1 is a perspective view illustrating a cab having a rollover protection structure for a construction machine in the related art, and FIG. 2 is an exploded perspective view illustrating a cab having a rollover protection structure for a construction machine according an embodiment of the present invention.

A cab having a rollover protection structure for a construction machine according to a preferred embodiment of the present invention includes a front right pole 100 positioned on the front right side of the cab and formed to extend upwardly from a bottom frame; a front left pole 200 positioned on the front left side of the cab and formed to be spaced apart from the front right pole 100; a front upper end lateral pole 300 connecting upper ends of the front right pole 100 and the front left pole 200 to each other; a first reinforcement member 110 installed on an upper portion of the front right pole 100; and a second reinforcement member 210 installed on a lower portion of the front left pole 200.

As illustrated in FIG. 2, the cab having a rollover protection structure for a construction machine according to the preferred embodiment of the present invention includes the front right pole 100, the front left pole 200, the front lateral pole 300, the first reinforcement member 110, and the second reinforcement member 210.

As illustrated in FIG. 1, the front right pole 100, the front left pole 200, and the front lateral pole 300 are constructed in the same manner as those in the related art. That is, the front right pole 100 and the front left pole 200 extend upward from the bottom frame, and may be formed of pipes having a deformed cross-sectional structure.

The front right pole 100 and the front left pole 200 are positioned on the front left and right sides of an operator in the cab, and upper ends of the front right pole 100 and the front left pole 200 are connected to each other by the front lateral pole 300.

The first reinforcement member 110 is inserted into the inside of the upper end of the front right pole 100, and the front right pole 100 and the first reinforcement member 110 are integrated by plug welding or the like. In this case, it is preferable that the first reinforcement member 110 is applied with respect to about a half of the upper side of the front right pole 100 in consideration of a portion that a working device, such as a boom, can contact when the rollover of the equipment occurs.

The second reinforcement member 210 is inserted into the inside of the lower end of the front left pole 200, and the front left pole 200 and the second reinforcement member 210 are integrated by plug welding or the like. In this case, it is preferable that the second reinforcement member 210 is applied with respect to about a half of the lower side of the front left pole 200 in consideration of the load that is applied to the front left pole 200 during the rollover and the load support point.

That is, although the first reinforcement member 110 and the second reinforcement member 210 are applied with respect to about halves of the front right pole 100 and the front left pole 200 in consideration of the load that is applied during the rollover and the range of damage, an equivalent effect to that in the case where the front right pole 100 and the front left pole 200 are entirely reinforced can be obtained. Accordingly, when the rollover occurs, it becomes possible to protect the operator while reducing the manufacturing cost of the cab.

The cab having a rollover protection structure for a construction machine according to the preferred embodiment of the present invention may further include a third reinforcement member 510 installed in the center of a ceiling portion of the cab and arranged to be spaced apart from the front upper end lateral pole 300.

As illustrated in FIG. 2, the third reinforcement member 510 is provided.

The third reinforcement member 510 is installed in the center of the ceiling portion of the cab to be spaced apart from the front upper end lateral pole 300.

In the case where the third reinforcement member 510 is positioned in the neighborhood of the front upper end lateral pole 300, it is not easy to secure the field of upper vision, and thus the third reinforcement member 510 is provided to be space apart from the front upper end lateral pole 300 for a predetermined distance in the rearward direction.

In the cab having a rollover protection structure for a construction machine according to the preferred embodiment of the present invention, the first reinforcement member 110, the second reinforcement member 210, and the third reinforcement member 510 are made of a hollow pipe or a general strength member, and the first reinforcement member 110 and the second reinforcement member 210 are inserted into the front right pole 100 and the front left pole 200, respectively.

Further, in a typical cab structure, portions where the front right pole 100 and the front left pole 200 are coupled to the front upper end lateral pole 300 and the front lower end lateral pole 400 are reinforced by the reinforcement members. Since this feature is also included in the cab structure according to the present invention, the separate explanation thereof will be omitted.

Since the first reinforcement member 110, the second reinforcement member 210, and the third reinforcement member 510 are made of a hollow pipe or a general strength member, the material cost is reduced, and since the whole weight of the cab is light, the maintenance cost is saved.

As illustrated in FIG. 2, it is possible that the lateral cross-section of the first reinforcement member 110 and the second reinforcement member 210 is in "☐"-shape.

It is possible that the first reinforcement member 110 and the second reinforcement member 210 are inserted into the front right pole 100 and the front left pole 200, respectively. It is preferable that the first reinforcement member 110 or the second reinforcement member 210 has a structure in which holes or gaps are provided for effective spreading of paints.

In the cab having a rollover protection structure for a construction machine according to the preferred embodiment of the present invention, the second reinforcement member 210 has a cross-sectional area that is gradually reduced in an upward direction from the lower end thereof in proportion to the distance at the lower end thereof.

The second reinforcement member 210 can be formed so that the cross-sectional area thereof is gradually reduced in the upward direction. For example, the lateral cross section of the second reinforcement member 210 is designed to be gradually reduced in proportion to the distance from the lower end through finite element analysis.

It is also possible that the lateral cross section of the first reinforcement member 110 is proportionally changed through the finite element analysis.

In the cab having a rollover protection structure for a construction machine according to the preferred embodiment of the present invention, the lateral cross-sectional area of the third reinforcement member 510 is larger than the lateral cross-sectional area of the front upper end lateral pole 300.

It is possible that the lateral cross-sectional area of the third reinforcement member 510 becomes larger than the lateral cross-sectional area of the front upper end lateral pole 300.

In order to maximally secure the field of upper vision, it is preferable to relatively increase the lateral cross-sectional area of the third reinforcement member 510 instead of minimizing the lateral cross-sectional area of the front upper end lateral pole 300 that is positioned at the front upper end of the cab.

INDUSTRIAL APPLICABILITY

As apparent from the above description, the present invention can be applied to the construction machinery industry fields.

The invention claimed is:

1. A cab having a rollover protection structure for a construction machine, comprising:
   a front right pole positioned on the front right side of the cab and formed to extend upwardly from a bottom frame;
   a front left pole positioned on the front left side of the cab and formed to be spaced apart from the front right pole;
   a front upper end lateral pole connecting upper ends of the front right pole and the front left pole to each other;
   a first reinforcement member inserted into an upper portion of the front right pole; and
   a second reinforcement member inserted into a lower portion of the front left pole;
   a third reinforcement member installed in a center of a ceiling portion of the cab and spaced apart from the front upper end lateral pole;
   a lateral cross-sectional area of the third reinforcement member is larger than a lateral cross-sectional area of the front upper end lateral pole;
   wherein:
      the first reinforcement member terminates prior to reaching a midpoint of the front right pole and prior to reaching a lower end of the front right pole, and the second reinforcement member terminates after crossing a midpoint of the front left pole and prior to reaching an upper end of the front left pole; and
      the second reinforcement member having a cross-sectional area that gradually and uniformly decreases in size along a length of the second reinforcement member in a direction from a lower end of the second reinforcement member to an upper end of the second reinforcement member, such that the size of the cross-sectional area at any point along the length is directly proportionate to a distance from the lower end of the second reinforcement member.

2. The cab having a rollover protection structure for a construction machine according to claim 1, wherein the first reinforcement member, the second reinforcement member, and the third reinforcement member are made of a hollow pipe or a general strength member.

* * * * *